W. F. EMERSON.
COASTER BRAKE.
APPLICATION FILED MAY 21, 1917.
1,340,386.
Patented May 18, 1920.
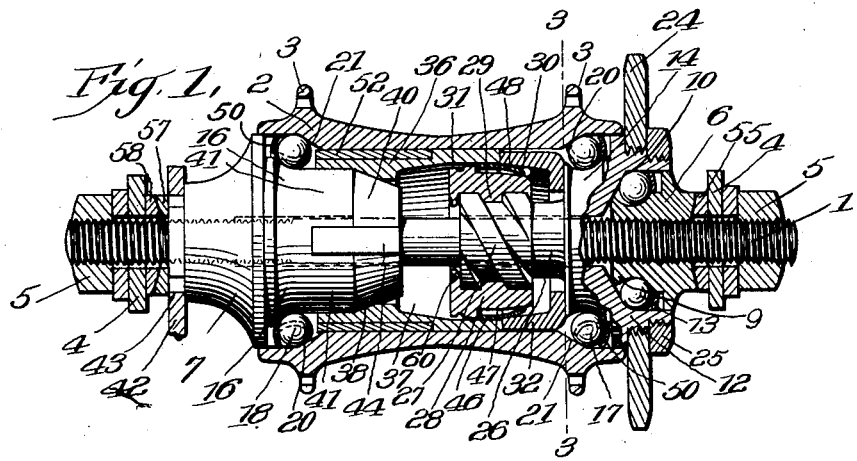
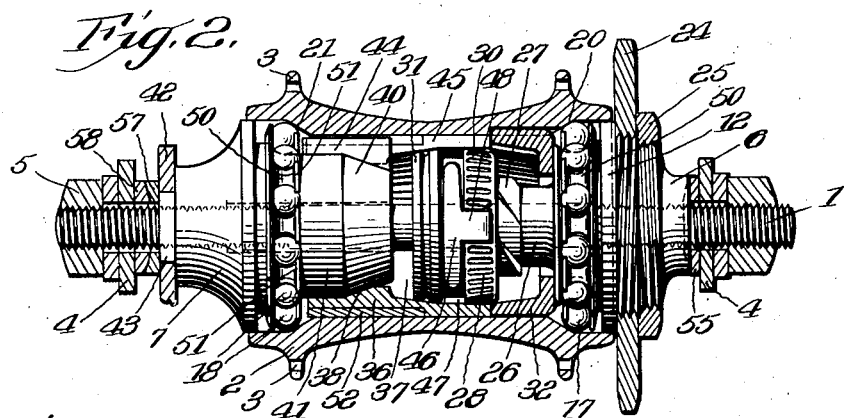
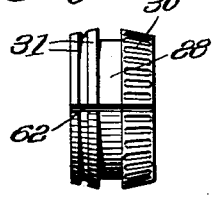
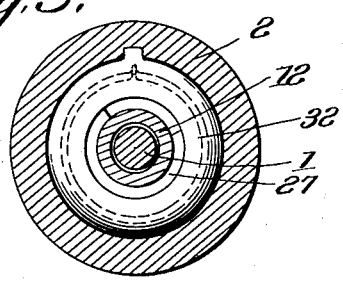
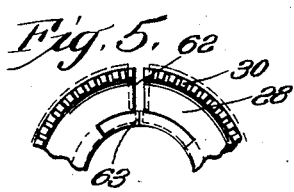
Inventor
William F. Emerson.
By his Attorney
Alfred Wilkinson

UNITED STATES PATENT OFFICE.

WILLIAM F. EMERSON, OF BUFFALO, NEW YORK.

COASTER-BRAKE.

1,340,386.   Specification of Letters Patent.   Patented May 18, 1920.

Application filed May 21, 1917. Serial No. 169,866.

*To all whom it may concern:*

Be it known that I, WILLIAM F. EMERSON, a citizen of the United States, residing at Buffalo, in the county of Erie and State of New York, have invented new and useful Improvements in Coaster-Brakes, of which the following is a specification.

This invention relates to coaster driving and braking mechanism for bicycles and the like and consists in improved features of construction and arrangement designed particularly with a view to producing a coaster brake which will be simple and effective in operation, of few and substantial parts and which may be easily assembled.

The improved construction and arrangement of my invention is disclosed in the accompanying drawing wherein the reference characters of the description are applied to the corresponding parts in the several views. Therein Figure 1 is a longitudinal sectional view of a coaster-brake embodying the features of my invention. Fig. 2 is a similar view taken in right angular relation to Fig. 1 and having the coupling member in elevation. Fig. 3 is a cross-sectional view in line 3—3 of Fig. 1. Fig. 4 is a view in elevation showing a modified form of coupling member and Fig. 5 is an enlarged end view of a portion thereof.

In the embodiment of my invention here shown the parts are arranged to form the hub of the wheel and to provide the bearings therefor and is designed whereby on the forward rotation of a driving member a clutch effects engagement to couple the wheel thereto while on the reverse rotation of the driving member the operation of a suitable brake is effected to cause braking of the hub and with the driving member at rest the wheel is permitted to rotate freely for coasting.

In the construction disclosed 1 indicates the usual stationary axle or spindle for the wheel hub rigidly supported in the rear forks 4 of the cycle frame and threaded at its end portions to receive the securing nuts 5—5 employed to clamp it in position. The usual hub barrel 2, forming a casing for the operating parts is journaled to rotate about the axle. The hub is provided with the usual spoke flanges 3.

The bearing arrangement whereby the hub is journaled to rotate concentric with the axle consists of the inner bearing cone 6 at the right and the brake bearing member 7 at the left. The former member 6 is provided with a conical bearing portion 9, co-acting with an internal cup-cone or ball race 10, of the driving member 12, to form a raceway for interposed bearing balls 13 upon which the driving member is journaled to rotate on the member 6. The driving member 12 is also formed to provide the external conical bearing portion 14 and the brake-member 7 is provided with an exterior bearing surface 16. Riding on the bearing portion 14 and on the portion 16 are the respective ball bearings 17 and 18 for the hub 2, the hub being formed with the outwardly directed inclined surfaces 20—21 complemental to the bearing surfaces 14 and 16 in providing raceways for the balls 17 and 18. By this arrangement the hub is journaled at one side upon the driving member 12 and at the opposite side upon the brake bearing member 7 as illustrated.

In the customary manner it is arranged that normally the hub barrel 2 is permitted to rotate independently and freely on its bearings 17 and 18 which occurs when the wheel hub moves forwardly with relation to the driving member 12 as when the driving member is held at rest during coasting. Means are provided in the usual manner to be actuated by the operating member whereby on its forward rotation coupling of the operating member to the hub is effected for propelling the latter and on the reverse rotation of the operating member a suitable brake is set to have frictional engagement with the interior of the hub to retard the rotation of the wheel.

In my improved construction here disclosed, the customary sprocket wheel 24 is threaded onto the operating member 12 and secured thereon by the usual nut 25. The operating member is formed with an integral sleeve extension 26 provided with an inclined thread or screw spline 27 to which is fitted the coupling or actuating member 28, the latter being formed with an internal spline 29 complemental to the spline 27 upon which it is threaded whereby rotation of the operating member 12 relative to the coupling member 28 will produce a lateral movement of the latter. As shown, the coupling member is provided with outwardly directed inclined surfaces, 30, and 31 to coact with suitable internal conical surfaces during driving and braking respectively. In the former operation upon forward rotation of the driving member 12, the coupling member will be moved to the right, thereby to effect the engagement of the conical surface 30 with the co-acting internal inclined surface of a driving cup 32 secured to rotate with the hub 2. In accordance with my present invention the conical surface 30 of the coupling member 28 is suitably corrugated as shown so as to produce an effective locking engagement with the cup 32 thereby to couple the driving member to the hub for propelling. As will be readily understood, the corrugations of the surface 30 will permit of better and closer engagement of the contacting surfaces by displacing of any oil or lubricant therebetween.

To produce an effective braking of the hub upon the reverse rotation of the driving member 12, I have devised an improved brake construction comprising a split brake sleeve member 36 which is split longitudinally as shown in Fig. 2 and is formed on its inner peripheral surface with oppositely and outwardly directed inclined or conical surfaces 37 and 38. To co-act with said internal conical surfaces 37 and 38, for expanding of the brake sleeve into braking engagement with the hub, the inclined surface 37 is positioned to be engaged by the inclined or conical surface 31 of the coupler 28 when the latter is shifted to the left as indicated in Fig. 2. In addition thereto the internal inclined surface 38 of the brake sleeve is positioned to engage with a co-acting conical expanding surface 40 formed upon a sleeve extension 41 of the fixed brake member 7. The resulting action is that when the coupling member 28 is shifted to the left, which occurs upon the reverse rotation of the driving member 12, the coupling member by means of its conical surface 31 will engage the inclined surface 37 of the brake sleeve and exert a pressure thereon toward the left hand side as shown whereby the brake sleeve will be expanded under the combined action of the inclined surfaces 31 and 40 co-acting with the inclined surfaces 37 and 38 of the brake sleeve. As will be readily understood this arrangement provides a very effective brake construction for the reason that the brake sleeve is expanded into braking contact with the hub from its opposite end portions in a balanced relation, this arrangement providing a very effective brake construction. The brake bearing member 7 is held from rotation in the usual manner by means of a holding arm 42 fitted to a squared shoulder 43 on the member 7, and the brake sleeve 36, as shown, is secured against rotation by means of a key 44 on the extension 41 entering the longitudinal division slot 45 of the brake sleeve as shown in Fig. 2.

A further desirable feature of my invention consists in an improved means for insuring the movement of the driving member 12 relative to the coupling member 28 so that the latter will be shifted. For this purpose I have provided springs 46 oppositely arranged and fitted to a suitable circumferential groove 47 in the coupling member as shown. These springs are formed with lateral extensions 48 received in enlargements of the groove 47 in the coupler and as will be readily understood the curvature of the springs 47 are of a radius smaller than the periphery of the coupler so that in their position, interposed between the coupler 28 and the brake sleeve as shown, they are compressed to provide a frictional retard for the coupler. The extensions 48 of the springs rotatively secure them to the coupler and likewise provide a supplemental spring action by reason of their curvature as shown.

The bearing surfaces 9 and 14 are provided by grooving the members 6 and 12. The bearing balls 13, 17 and 18 are confined within suitable retainers 50 of flat metal provided with flared flaps 51 which are bent outwardly, whereby the balls 13, 17 are retained in position in the grooved surfaces 9 and 14 on the members 6 and 12 and are removable therewith and the balls 18 are secured on the member 7 by means of the key 44 engaging the ball retainer.

The brake sleeve 36 is desirably made of steel so as to possess the desirable resiliency and wearing qualities and preferably has secured thereon a frictional sleeve 52 of brass or other softer metal to increase the braking friction.

A further feature of my improved construction is designed to relieve the cycle frame of undue strain and consists in providing the bearing member 6 with a concave outer surface engaged by a convex washer 55 interposed between the cycle frame or fork member 4 and the member 6 whereby upon rigidly clamping the brake 7 in position by means of the securing nuts 5 a proper alinement is secured. On the opposite side, complemental concave and convex surface washers 57—58 are employed for the same purpose.

The construction and arrangement disclosed permits of conveniently assembling the parts. This is accomplished by threading the member 7 upon the axle 1 and placing the hub thereon after which the successive parts may be placed in position from the opposite end of the hub. As shown in Fig. 1, I desirably mutilate the thread of the coupling member 28 as indicated at 60 whereby said member can only be assembled upon the sleeve 26 in the proper manner thus contributing to the facility with which the parts may be correctly assembled.

In Figs. 4 and 5 I have illustrated a desirable modification designed to eliminate the necessity of employing the retarding springs 46. To this end I have shown the coupling member 28 severed longitudinally at one point, as indicated at 62 to permit of its expanding slightly to have frictional engagement with the internal surface of the brake sleeve 36 to produce a retarding effect sufficient to insure the movement of the driving member 12 relative to the coupler 28. This is accomplished desirably by cutting or slotting the member but part way so as not to sever it, prior to case hardening and thereafter, splitting the remaining portion as at 63 so as to sever the ring whereby it may expand. By this method the proper shape is preserved during hardening and when forced into coupling engagement with the incline of the members 32 and 36 the abutting ends at 63 will determine the limit of compression and prevent gripping of the sleeve 26 under compression. As will be readily seen, during the driving operation the coupling member 28 will be in its normal contracted condition at which time its diameter will be such as not to have engagement with the brake sleeve 36.

Having described my invention I claim:

1. In a driving and braking mechanism, the combination with the axle and a hub suitably journaled to rotate about said axle, of a driving member suitably journaled and having an extension provided with an inclined cam thread, a coupler member adapted to have threaded engagement with the cam thread, said coupler having oppositely directed conical actuating surfaces, braking means arranged to be actuated by one of said conical surfaces upon shifting of the coupler in one direction, means engaged by the opposite conical surface to effect coupling of the driving member and the hub when the coupler is shifted in the other direction and said coupler member being split to be expansible to maintain frictional contact at all times to insure rotative movement of the driving member with relation thereto.

2. In a driving and braking mechanism, the combination with the axle and a hub suitably journaled to rotate about said axle, of a driving member suitably journaled and having an extension provided with an inclined cam thread, a coupler member adapted to have threaded engagement with the cam thread, said coupler having oppositely directed conical actuating surfaces, braking means arranged to be actuated by one of said conical surfaces upon shifting of the coupler in one direction, means engaged by the opposite conical surface to effect coupling of the driving member and the hub when the coupler is shifted in the other direction and said coupler member being split to be expansible to maintain frictional contact at all times to insure rotative movement of the driving member with relation thereto, and having engaging end portions to determine the minimum diameter of said coupler.

3. In a driving and braking mechanism, the combination with the axle and a hub suitably journaled to rotate about said axle, of a driving member suitably journaled, a coupler member, means on the driving member adapted to shift the coupler member upon rotation of the driving member with relation thereto, braking means arranged to be actuated by said coupler when the latter is shifted in one direction, means engaged by the coupler member when shifted in the opposite direction operative to effect coupling of the driving member to the hub and said coupler member being split to be expansible into frictional contact at all times to insure rotative movement of the driving member with relation thereto.

4. In a driving and braking mechanism, the combination with the axle and a hub suitably journaled to rotate about said axle, of a driving member suitably journaled, a coupler member, means on the driving member adapted to shift the coupler member upon rotation of the driving member with relation thereto, braking means arranged to be actuated by said coupler when the latter is shifted in one direction, said braking means having a non-rotatable member, means engaged by the coupler member when shifted in the opposite direction operative to effect coupling of the driving member to the hub and said coupler member being split to be expansible into frictional contact with said non-rotatable brake member thereby to insure rotative movement of the driving member with relation thereto.

5. In a driving and braking mechanism, the combination with the hub and the axle, of a driving member suitably journaled, a stationary brake member having a conical brake actuating surface, a shiftable coupler member, engaging means between the driving member and the coupler member whereby rotation of the driving member with relation to the coupler member will shift the latter longitudinally of the axle, said coupler having outwardly directed conical surfaces, an expansible brake sleeve fitted within the hub and keyed to the stationary brake member, said sleeve being provided with outwardly directed conical surfaces interposed between the brake and coupler members to effect expansion of said sleeve by the conical surfaces of said members, when the coupler member is shifted in one direction, means engaged by the coupler member when shifted in the opposite direction operative to couple the driving member to the hub and said coupler member being split to be expansible into frictional contact with the brake sleeve to insure rotative movement of the driving member with relation to the coupler member.

6. In a driving and braking mechanism, the combination with the hub and the axle, of a driving member suitably journaled, a stationary brake member having a conical brake actuating surface, a shiftable coupler member threaded to the driving member to be shifted laterally thereby, said coupler having outwardly directed conical surfaces, an expansible brake sleeve fitted within the hub and keyed to the stationary brake member, said sleeve being provided with internal outwardly directed conical surfaces interposed between the brake and coupler members to effect expansion of said sleeve by the conical surfaces of said members, a driving cup member rotatively secured to the hub, and provided with an internal conical surface positioned to be engaged by the adjacent conical surface of the coupler, said latter surface being corrugated and said coupler being formed whereby it may be threaded onto the driver only with said corrugated conical surface in co-acting relation with the cup member.

7. In a driving and braking mechanism, the combination with the hub and the axle, of a driving member suitably journaled, a stationary brake member having a conical brake actuating surface, a shiftable coupler member threaded to the driving member to be shifted laterally thereby, said coupler having outwardly directed conical surfaces, an expansible brake sleeve fitted within the hub and keyed to the stationary brake member, said sleeve being provided with internal outwardly directed conical surfaces interposed between the brake and coupler members to effect expansion of said sleeve by the conical surfaces of said members, a driving cup member having a key thereon entering a slot in the hub, and provided with an internal conical surface positioned to be engaged by the adjacent conical surface of the coupler, said latter surface being corrugated and said coupler being formed whereby it may be threaded onto the driver only with said corrugated conical surface in co-acting relation with the cup member, and said coupler member being split to be expansible into frictional contact with the brake-sleeve thereby to insure rotative movement of the driving member with relation to said coupler.

8. In a driving and braking mechanism, the combination with the axle and a hub suitably journaled to rotate about said axle, of a driving member suitably journaled, coupling means, means on the driving member adapted to actuate the coupling means, braking means arranged to be actuated by said coupling means when the driving member is rotated in reverse direction, said braking means having a stationary bearing member, means engaged by the coupling means to couple the driving member to the hub on the forward rotation of the former, a bearing cone threaded on the axle and having an external bearing portion, bearing balls interposed between said cone and the driving member whereby the latter is journaled on the former, said driving member being formed with an external conical bearing portion, bearing balls interposed between said external bearing and the hub to journal the latter upon the driving member, a conical bearing portion provided on the brake bearing member, bearing balls interposed between said latter portion and the hub to journal the hub on the brake member, retainers for the bearing balls formed to prevent separation of the balls therefrom in an axial direction and a retaining shoulder associated with the external bearing portions permanently to retain the bearing balls in proper position, substantially as described.

9. In a driving and braking mechanism, the combination with the hub and the axle, of a driving member, a stationary brake member having a conical brake actuating surface thereon, means to secure the brake member from rotation, a shiftable coupler member actuated by the driving member and provided with outwardly directed conical surfaces, an expansible brake sleeve fitted within the hub and adapted to be expanded into breaking contact upon movement of the coupler toward the brake member by the engagement of the conical surfaces, a key affixed to the brake member and engaging said sleeve, a driving cup connected to the hub and formed with an internal conical surface arranged to be engaged by the adjacent conical surface of the coupling member, said latter surface being corrugated, a bearing cone threaded to the axle and having an external bearing portion, bearing balls interposed between said cone and the driving member whereby the latter is journaled on the former, said driving member being formed with an external conical bearing portion, bearing balls interposed between said external bearing and the hub to journal the latter upon the driving member, a conical bearing portion provided on the brake member, bearing balls interposed between said latter portion and the hub to journal the hub on the brake member, retainers for the bearing balls formed to prevent separation of the balls therefrom in an axial direction, said securing key being adapted to secure the bearing balls upon the brake member against longitudinal displacement and said external bearing portions of the cone and driving member each having a radial shoulder associated therewith adapted permanently to secure the bearing balls from longitudinal displacement whereby they will remain in position when the driving and braking parts are separated.

In testimony whereof I have signed my name to this specification.

WILLIAM F. EMERSON.